United States Patent [19]

Stecklein

[11] 4,030,276
[45] June 21, 1977

[54] INTEGRALLY MOLDED BELT WITH WORKING ELEMENT ATTACHED THERETO

[75] Inventor: Alfred L. Stecklein, Littleton, Colo.

[73] Assignee: The Gates Rubber Company, Denver, Colo.

[22] Filed: June 8, 1973

[21] Appl. No.: 368,424

[52] U.S. Cl. .............................. 56/291; 74/231 R
[51] Int. Cl.² ...................................... A01D 55/24
[58] Field of Search ........................... 56/291–293, 56/119, 244, 245, 290; 74/231 R, 234, 237

[56] References Cited
UNITED STATES PATENTS

| | | | |
|---|---|---|---|
| 1,923,542 | 8/1933 | Keyes et al. ................. | 74/231 R X |
| 2,531,111 | 11/1950 | Daniels ........................... | 74/231 R |
| 2,560,307 | 7/1951 | Slemmons ....................... | 74/231 R |
| 3,545,188 | 12/1970 | Locati ............................. | 56/292 |
| 3,561,202 | 2/1971 | Tupper ........................... | 56/291 |
| 3,698,167 | 10/1972 | Hurlburt et al. ................ | 56/291 |

FOREIGN PATENTS OR APPLICATIONS 920,458  2/1954  Germany ........................... 56/291

Primary Examiner—J.N. Eskovitz
Attorney, Agent, or Firm—H. W. Oberg, Jr.; Raymond Fink; Curtis H. Castleman, Jr.

[57] ABSTRACT

An integrally molded belt with at least one working element attached thereto by means of at least two spaced connectors transversely aligned in relation to the belt.

8 Claims, 6 Drawing Figures

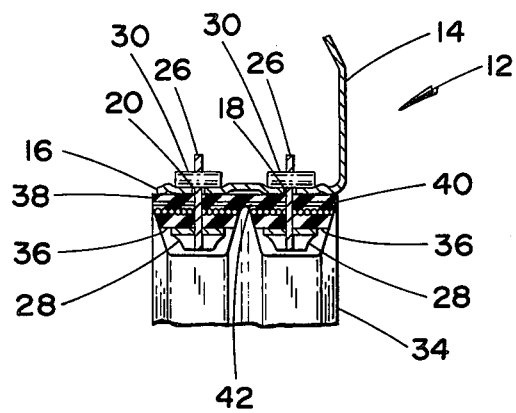
FIG. 3
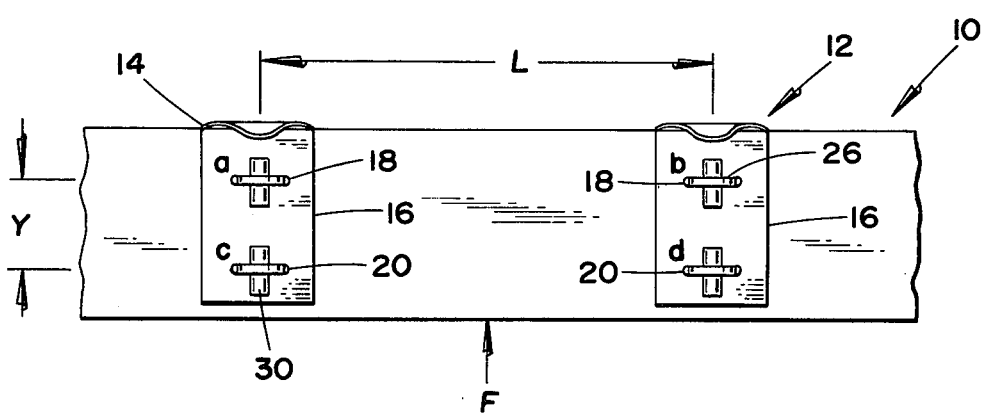
FIG. 4
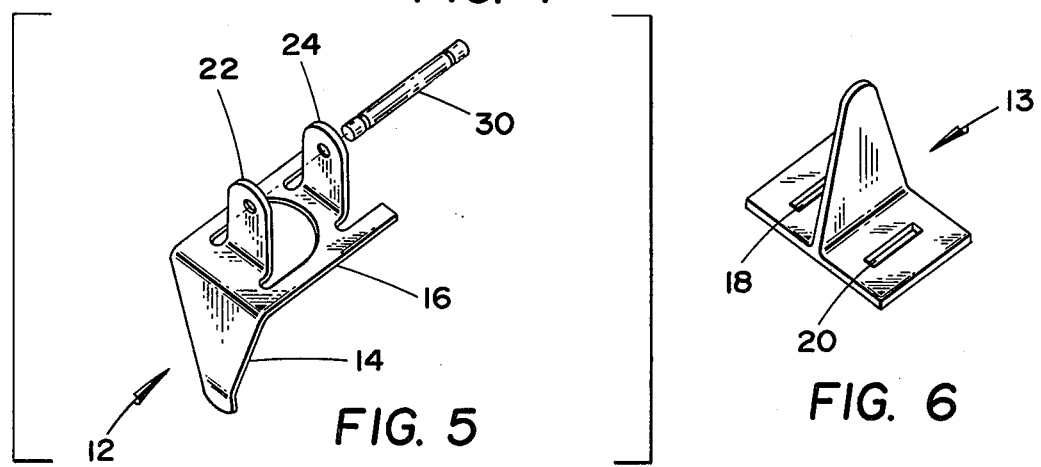
FIG. 5
FIG. 6

INTEGRALLY MOLDED BELT WITH WORKING ELEMENT ATTACHED THERETO

BACKGROUND OF THE INVENTION

This invention relates to harvesters, but more particularly, the invention relates to an endless member adapted for cutting, gathering, conveying, or the like.

In harvesting equipment, it is sometimes advantageous to use power transmission belts for performing work in addition to their normal function of power transmission. One or more working elements, such as a crop cutter or crop gatherer, may be attached to the exterior of the belt, Examples of such devices appear in U.S. Pat. Nos. 2,728,181; 2,782,582; 2,867,069; 3,397,524; 3,545,188; 3,651,626; and 3,699,757. While such belts offer many advantages in the sphere of crop harvesting, they are not free of problems. Belts with cutters are driven at approximately 8,000 to 12,000 feet per minute to effect impact cutting while belts with crop engaging fingers are driven up to a few hundred feet per minute to effect crop conveying.

Long belt spans are required for agricultural type cutters or mowers. The long spans and attached cutters may cause the belt to longitudinally or torsionally vibrate at such a frequency as to cause instability which may result in the belt disengaging from its sheaves. Heretofore and as disclosed in U.S. Pat. No. 3,651,626, instability caused by a twisting force on the cutter may be reduced by locating the center of gravity of the cutter element over the belt center with connectors extending through or from the belt center at alignment accuracy of one degree or less. The Patent also teaches that the belt jacket may be two plies of nylon or dacron, and the belt body may be fiber load to produce " . . . maximum torsional modulus" which, in turn, improves stability.

While the prior art may offer some partial solutions to the problem of belt stability, they do not offer total solutions, but rather introduce some design limitations. For example, the cutter is purposely not offset from the edge of the belt to space the plane of the sheaves away from the foliage being cut. Such a displacement, the art teaches, offsets the center of gravity of the cutter causing belt twisting. Also, the art indicates that maximum torsional modulus may only be achieved with a multiple ply belt jacket and fiber loading of the stock which may inhibit longitudinal flexibility for bending around sheaves, or impose economic burdens associated with construction thereof.

SUMMARY OF THE INVENTION

In accordance with the invention a power transmission belt is provided with one or more working elements attached to the exterior thereof. A portion of the working element extends transversely across and is attached to the belt at two connecting portions spaced and aligned transversely in relation to the belt. Preferably, the belt includes two or more V-belt portions that are attached side-by-side with an integral tie band. An example of such a belt is disclosed in U.S. Pat. No. 3,404,577. The spaced connecting portions of the working element and the multiple V-belt operate to further enhance belt stability.

Accordingly, an object of the invention is to provide a belt-working-element combination which enhances belt stability.

Another object of the invention is to provide a belt cutter combination which allows the center of gravity of the cutter to be offset from the belt center without introducing instability to the belt.

Still another object of the invention is to provide a working element attachment mechanism which enhances torsional and longitudinal stability of a carrier belt.

These and other objects or advantages of the invention will be apparent after reviewing the figures and description thereof wherein:

FIG. 3 is a vertical cross-sectional view showing the belt and working element of FIG. 2 in engagement with a multiple grooved sheave.

FIG. 4 is a top plan view of the belts of FIGS. 1 or 2.

FIGS. 5 and 6 are isometric views showing alternate forms of working elements.

DESCRIPTION OF PREFERRED EMBODIMENTS

Figure 1:
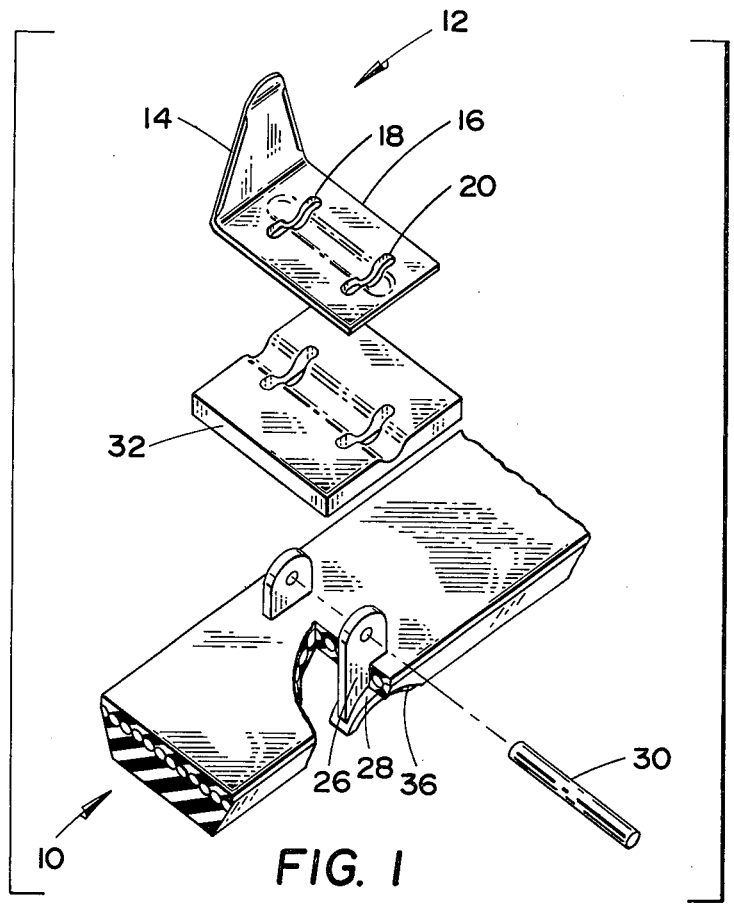
FIG. 1 is an exploded isometric view showing a connection means between a working element and belt.
Figure 2:
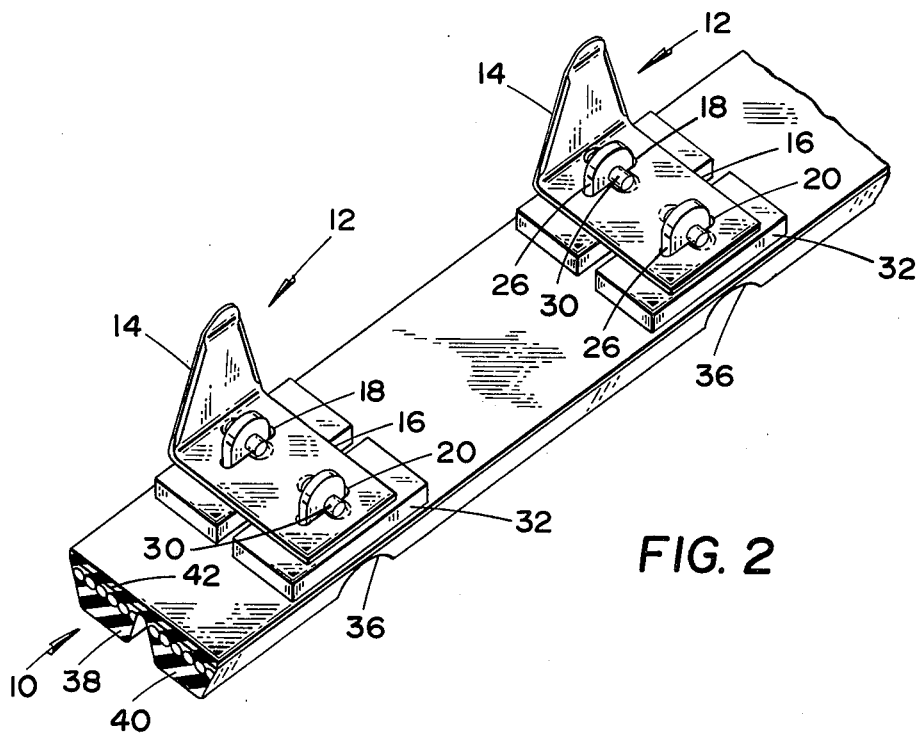
FIG. 2 is an isometric view showing an alternate belt form with spaced working elements attached thereto.

Referring to the Figures, belt assemblies are shown which include an integrally molded carrier 10 belt to which is attached one or more working elements. The working elements may be designed for any purpose such as vegetation cutting or crop harvesting. By way of illustration and not limitation, the working elements of FIGS. 1 through 5 relate to cutters 12 whereas the elements of FIG. 6 relates to vegetation gatherers or conveyers 13.

As shown in FIGS. 1 through 5, the cutter 12 includes a blade portion 14 to which is attached a flange portion 16. The blade 14 may be integral with the flange 16 or attached in any convenient manner such as riveting, welding, or the like. The cutter is preferably made of a high quality steel for durability. The flange portion has at least two spaced connecting portions. Should more than two connecting portions be desired, they are preferably arranged in lineal alignment. The connecting portions may be perforations 18, 20 such as shown in FIGS. 1 through 4 and 6, or tabs 22, 24 as shown in FIG. 5. The tabs may be integral with the flange portion or separately attached.

The flange 16 is arranged to extend generally transversely of the carrier belt 10 such that the lineal alignment of the connecting portions are also transversely aligned. Preferably, the connecting portions are aligned $90° \pm 10°$ in relation to the longitudinal axis of the belt to allow optimum flexure of the assembly for going around sheaves. Good alignment minimizes the chordal affect introduced into the belt as it is bent around the sheaves. The cutter 12 is attached to the top or exterior of the belt 10 with any desirable fastening means. For example and as shown in FIGS. 1 through 4 a connector including a tab 26 and slotted yoke 28 extends through the belt from near a neutral flexural axis from the undercord and connects with the cutter at the connecting portions 18, 20 of the flange. A locking pin 30 extends through the connector tab holding the assembly together. Optionally, a resilient pad 32 may be used between the belt 10 and cutter 12 to bias the assembly together. In the case of the working element as shown in FIG. 5, tabs 22, 24 extend through the belt to near a neutral flexural axis of the belt. One or more locking pins 30 may be used to hold the cutter 12 in place in cooperation with the resilient polymeric material of the belt. The blade of the cutter may advantageously extend past the peripheral edge of the belt to place it in a plane offset from that of a belt sheave as shown in FIG. 3. However, it is not intended to limit the invention to such an offset arrangement as working elements such as gatherers 13 as shown in FIG. 6, may be advantageously used where the crop engaging portion of the element is near the center of the belt.

The advantages of the transversely spaced connecting portion feature of the invention may best be understood in conjunction with dynamic operation of the belt. In use, the carrier belt is trained around driver, idler, and driven sheaves as desired. In the case of a cutter application, the belt is driven at speeds that range generally between 8,000 to 12,000 feet per minute. Centrifugal force acts to rotate the offset blade about the longitudinal axis of the belt. The spaced connecting portions 18, 20 or 22, 24 in cooperation with the flange 16 extending transversely of the belt provide an effect which enhances torsional rigidity and inhibits rotational movement of the blade away from foliage being cut.

One or more slotted yokes may be used across the undercord or bottom of the belt to attach the working element at the connecting portions. The yoke compliments a notch 36 formed in the belt undercord. The yoke 28, tabs 26 and flange 16 also cooperate to further increase the torsional rigidity of the belt in the area of the working element. Of course, when multiple belt sections are tied together with a band 32 as shown in FIG. 3, separate yokes or fasteners must be used to allow entry of the belt into the sheave 34.

The placement of the blade to an offset position from the belt not only permits foliage to be cut closer to the ground, but also precludes the problem of the sheaves interfering with the cutting process. When a cutter element is placed near the center axis of the belt, the sheave is in a plane that is closer to the ground than the blade. In this situation, the sheave acts as an inefficient cutter which causes uneven cutting.

The spaced connecting portions 18, 20 or 22, 24 also increase the lateral stiffness of the belt to promote stability, especially when more than one working element is spaced along the top of the belt. Referring to FIG. 4, two working elements are shown on a portion of belt. The elements are spaced a distance L apart and are connected to the belt at the two connecting portions 18, 20 spaced Y apart. The flanges 16 have at least four points of connection arranged in rectilinear fashion. The belt span between the flanges may be thought of as a beam where that portion of the belt between connecting portions $a, b$ is in tension and that portion between $c, d$ is in compression (or a lesser tension) along a longitudinal line between the connecting portions when a side load F is applied to the belt. Such a side force may be imposed on the belt when the cutters engage foliage or foreign obstacles such as rocks. The number of working elements and their longitudinal spacing L affect the amount of improved torsional and lateral stiffness which may be imparted to a belt by means of the spaced connecting portions of the invention.

It has been determined that torsional rigidity may further be improved by using at least two belts 38, 40 of substantially the same circumferential length that are tied together with an integral band 42 as shown in FIG. 3. It is theorized that the increase in lateral stability results from a beam effect associated with the two laterally spaced belts, the spaced connector portions and the use of a multiple groove sheave 34. The yoke 28 and tabs 26 extending through the belt increase the torsional stability as explained above. Lateral stability is also increased in a manner similar to that as explained in reference to FIG. 4. The longitudinally spaced connectors between the flange areas, divide the belt span into two parts. One belt may experience tension loading and the other part may experience a lesser tension loading (slight compression) when a lateral force is subjected to the belt. A single V-belt is supported in a sheave by the two converging sidewall portions. When two or more belts are tied together, the number of sidewalls increases which defines a greater surface area of contact between sheaves which further aids in increasing both torsional and lateral stability. The tie band 42 holds the two belts 38, 40 in spaced relationship, dampens vibration from one belt to the other as a working element (i.e. cutter 12) engages foliage or foreign objects such as rocks.

It is preferred that the working elements be aligned transversely in relation to the belt by means of a notch molded or cut in the belt undercord. The notch may be adapted to receive any desired yoke or attachment as previously discussed. When the two belts 38, 40 of FIG. 3 are used, the notches 36 are transversely aligned with each other in relationship to the belt assembly 10. A plurality of notches are longitudinally spaced along the inner surface or belt undercord. The notches may be equally spaced or randomly spaced to effect a pitch spacing which further increases belt stability by lessening the chance of harmonic reaction between the belt system and the supporting sheave system of machinery.

When cutters are used, they may have any desired profile. For example, the cutters may be slightly pitched in relation to the longitudinal axis of the belt to effect some degree of lift to be imparted to foliage after it has been cut. Foliage may then easily be transferred to other collecting systems.

It is thus seen that a primary advantage of the invention is associated with the double connecting portions 18, 20 and 22, 24 of the flange 16 which improves carrier belt stability. The improved stability lessens the chance or probability of the belts of turning over in, or disengaging from a supporting sheave. Also, a cutting element may be placed in a plane offset from the belt sheave and closer to the ground to effect closer foliage cutting.

The foregoing detailed description is made for the purpose of illustration only and is not intended to limit the scope of the invention which is to be determined from the appended claims.

What is claimed is:

1. A power transmission belt adapted to perform work in addition to power transmission comprising:
    at least two V-belts of substantially the same circumference and section arranged and spaced side-by-side in transverse alignment, the belts attached together with an integral tie-band at a radially outer surface of each V-belt to define an integral carrier belt;
    at least one operative element disposed exteriorly of the carrier belt, the element having at least two spaced attaching portions oriented transversely of the carrier belt;
    fastening means for attaching the operative element in at least two places to at least two V-belt transversely aligned portions of the carrier belt, the fastening means of each V-belt in substantially lineal alignment with each other at substantially ninety degrees in relation to the belt;

whereby the spaced attaching portions in cooperation with the fastening means enhances torsional rigidity of the carrier belt and stabilizes movements of the operative element transversely of the carrier belt.

2. A power transmission belt as set forth in claim 1 comprising:

a cutter blade extending generally radially of the belt, the blade including an apertured flange extending transversely of the carrier belt, the apertures transversely aligned, spaced and adapted to receive the fastening means, and which constitutes the working element.

3. A power transmission belt as set forth in claim 2 wherein the cutter blade extends from a point transversely offset from one peripheral edge of the carrier belt.

4. A power transmission belt as set forth in claim 1 comprising:

at least two endless belts of substantially the same circumference having a plurality of notches with curved bottom surfaces spaced along the radially inner surface of the endless belts, the notch spacing of one belt substantially equal to the notch spacing of the other belt, and the notches of one belt arranged in substantially transverse alignment with the notches of the other belt, the two belts constituting the V-belts, and the notches constituting an alignment portion for the fastening means.

5. A power transmission belt as set forth in claim 4 wherein the bottom surfaces of the notches are located near a neutral bending axis of the belts.

6. In a power transmission belt of the type having at least one working element attached exteriorly thereto to perform work other than power transmission, the improvement comprising:

at least two V-belts of substantially the same circumference and section arranged and spaced side-by-side in transverse alignment, the belts connected with an integral tieband near the radially outer surface of each V-belt to define the power transmission belt, the V-belts each having a plurality of transversely oriented notches formed in the radially inner surface of each belt, the longitudinal notch spacing of the V-belts being substantially equal and the notches of the belts arranged in transverse alignment with each other, the transverse notches defining an alignment and attaching portion in the power transmission belt;

a working element portion extending generally radially of the belt;

a flange portion extending transversely of the belt and attached to the working element portion, the flange portion including at least two spaced connecting portions in lineal alignment at substantially 90° in relation to the longitudinal axis of the belt; and fastening means for attaching the connecting portions of the flange securely to the belt at the alignment and attaching portion;

whereby the flange portion and the fastening means in conjunction with the connecting portions coact to reinforce and enhance the torsional rigidity of the belt juxtaposed the working element.

7. A power transmission belt as set forth in claim 6 comprising:

a flange portion integral with the working element portion and having at least two perforations in lineal alignment that constitute the connecting portions, the fastening means extending from the notches, and through the belt and flange perforations, securely afixing the flange portion to the belt.

8. A belt as set forth in claim 7 wherein the working element defines a cutter blade that is offset from the top edge of the belt.

* * * * *